United States Patent
Grunwald et al.

(10) Patent No.: US 6,683,691 B2
(45) Date of Patent: Jan. 27, 2004

(54) METHOD AND ARRANGEMENT FOR SPATIALLY RESOLVED AND TIME-RESOLVED INTERFEROMETRIC CHARACTERIZATION OF ULTRASHORT LASER PULSES

(75) Inventors: Ruediger Grunwald, Berlin (DE); Uwe Griebner, Berlin (DE); Thomas Elsaesser, Berlin (DE); Volker Kebbel, Bremen (DE); Werner Paul Otto Jueptner, Ritterhude (DE); Hans-Juergen Hartmann, Luebeck-Travemuende (DE)

(73) Assignees: Max-Born-Institut, Berlin (DE); Bremer Institut fur Angewandte Strahlentechnik GmbH, Bremen (DE)

( * ) Notice: Subject to any disclaimer, the term of this patent is extended or adjusted under 35 U.S.C. 154(b) by 130 days.

(21) Appl. No.: 09/876,099

(22) Filed: Jun. 8, 2001

(65) Prior Publication Data
US 2002/0033947 A1 Mar. 21, 2002

(30) Foreign Application Priority Data
Jun. 9, 2000 (DE) ......................................... 100 28 756

(51) Int. Cl.⁷ ................................................. G01B 9/02
(52) U.S. Cl. ...................................................... 356/450
(58) Field of Search .......................................... 356/450

(56) References Cited

U.S. PATENT DOCUMENTS

| | | | | |
|---|---|---|---|---|
| 3,702,937 A | * | 11/1972 | Browning | 250/210 |
| 4,722,604 A | * | 2/1988 | French et al. | 356/450 |
| 5,390,042 A | * | 2/1995 | Ito et al. | 359/189 |
| 6,243,206 B1 | * | 6/2001 | Wangler | 359/621 |
| 6,326,998 B1 | * | 12/2001 | Palum | 348/342 |
| 6,456,380 B1 | * | 9/2002 | Naganuma | 356/450 |
| 6,504,612 B2 | * | 1/2003 | Trebino | 356/450 |

OTHER PUBLICATIONS

O'Shea, P; R. Trebino. "Extremely simple intensity and phase ultrashort pulse measurement device with no spectrometer, thin crystal, or delay line." CLEO 2000, San Fransisco 2000, Technical Digest, Paper CFE6, 587–588.*
Trebino, Rick and Patrick O'Shea. "Highly Simplified Ultrashort–Pulse Measurement." Optical Society of America, 1999.*

* cited by examiner

Primary Examiner—Edward J. Glick
Assistant Examiner—Thomas R Artman
(74) Attorney, Agent, or Firm—Birch, Stewart, Kolasch & Birch, LLP

(57) ABSTRACT

Disclosed in a method and arrangement for performing a spatially resolved non-collinear measurement of the autocorrelation function of the first or higher order by means of a matrix of beam shaping individual elements, such that there is a local splitting of the beam into a beam matrix of conical component beams, where each component beam represents spatially integrated information regarding the partial area of the matrix through which it passes, the interference resolution is thus determined by the matrix geometry, and the interference pattern produced in space by each component beam in a certain plane imaged on a matrix camera supplies an autocorrelation function of the first order or, by utilizing non-linear interactions in a suitable medium, of a higher order accordingly, so that the coherence time or the pulse period of individual laser pulses or trains of multiple laser pulses can be determined as a function of location.

27 Claims, 2 Drawing Sheets

METHOD AND ARRANGEMENT FOR SPATIALLY RESOLVED AND TIME-RESOLVED INTERFEROMETRIC CHARACTERIZATION OF ULTRASHORT LASER PULSES

This application claims priority to German Patent Application No. 100 28 756.6, filed Jun. 9, 2000. The entire contents of the German Patent Application are hereby incorporated by reference.

BACKGROUND OF THE INVENTION

1. Field of the Invention

This invention relates to methods and arrangements for spatially resolved and time-resolved characterization of ultrashort laser pulses.

2. Related Art

For laser applications in the fields of working materials, spectroscopy, medicine, sensors and measurement technology, there is a demand for reliable and compact laser sources whose radiation must be suitably shaped and brought to the area of the specific interaction. In particular in the case of collimation, focusing or homogenization of high-performance lasers, laser components and complex laser systems must be optimized or adapted and interference must be eliminated for their stabilization.

In addition to the spectral and time profiles, other relevant measured variables include the intensity and phase distributions of the wave package as a function of location, which are variable over time and have not typically been measured by previously known arrangements for time-resolved characterization of ultrashort pulsed lasers in the subpicosecond range (see L. Sarger, J. Oberlé: "How to Measure the Characteristics of Laser Pulses" in: Claude Rullière: Femtosecond Laser Pulses, Springer Verlag, Berlin 1998, 177–201).

Although autocorrelation measurements of the first order (interferometer) only provide information about the coherence length of the pulse, information about the pulse period can also be derived in good approximation from autocorrelation functions of a higher order by means of non-linear optical interactions. The autocorrelation function of the second order can be obtained with a two-photon process such as second harmonic generation (SHG).

The known interferometric measurement methods can be divided into collinear and non-collinear methods with which autocorrelation functions can be measured in chronological order on the basis of changes in optical path length in one interferometer arm, and time-integrated detection of intensity is possible for different axial positions of two superimposed component beams or simultaneously by generation of conical or conically superimposed beam bundles and time-integrated detection of intensity for different transverse positions in a single-shot method.

In the non-collinear arrangement with axial symmetrical superpositioning of planar partial waves, interference patterns with the following spatial frequency are formed perpendicular to the direction of propagation:

$$v = \frac{2\sin(\alpha/2)}{\lambda}$$

($\lambda$=central wavelength of the wave package; $\alpha$=angle of the component beams to the optical axis).

These characteristic interference structures known from the production of holographic gratings, for example, i.e., rings in the case of radial symmetry, are typically imaged on a CCD camera and are resolved only if allowed by the magnification of the imaging system and the size of the camera pixels.

Therefore, rings are not observed with many arrangements that use a large angle, and there is automatic averaging, which would otherwise have to be performed by data analysis.

The averaged curve of the intensity distribution corresponds to an autocorrelation function from which the pulse period can be determined by using known mathematical procedures.

The only arrangement for measurement with spatial resolution known so far uses a complicated and expensive system of a so-called SPIDER type (SPIDER=spectral phase interferometry for direct electric-field reconstruction), where a spatial resolution is achieved in only one direction in space through the width of the gap of a spectrometer arrangement, where the other axis corresponds to the spectral coordinate (L. Gallmann, D. H. Sutter, N. Matuschek, G. Steinmeyer, U. Keller, C. Iaconia, I. A. Walmsley: "Spatially Resolved Amplitude and Phase Characterization of Ultrashort Optical Pulses Using SPIDER," CLEO 2000, San Francisco 2000, Technical Digest, Paper CFE1, 583–584).

Another known, relatively compact design uses a combination of cylindrical lenses and a Fresnel biprism, which can be regarded as a special case of an axicon, to generate two focused component beams that are superimposed (P. O'Shea, R. Trebino: "Extremely Simple Intensity-and-Phase Ultrashort-Pulse Measurement Device with No Spectrometer, Thin Crystal or Delay Line," CLEO 2000, San Francisco 2000, Technical Digest, Paper CFE6, 587–588).

This utilizes the spatial splitting of the beam in non-linear frequency conversion in a thick SHG crystal as a function of the respective spectral component. This arrangement is wavelength-specific, i.e., it cannot be used universally for any desired wavelength ranges, and it also does not yield spatial resolution. In addition, because of their thickness and dispersion, the refractive components that are used cause a deformation of the pulses in time even in front of the non-linear optical crystal, which thus represents another disadvantage of such arrangements.

Japanese Patent 9304189 A2 also describes an arrangement in which the crystal plane of a non-linear crystal in a single-shot correlator is designed with prismatic faces, but only as a macroscopic individual element.

SUMMARY OF THE INVENTION

The object of the present invention is to develop generic methods and an arrangement with which the disadvantages of the state of the art described herein can be avoided, and with which a spatially resolved and time-resolved measurement of the intensity of ultrashort laser pulses is achieved in single-shot operation with a design that is both compact and simple and is based on a correlator technique.

The object of this invention is achieved by methods according to the features of claims 1 and 8 and by an arrangement according to the features of claim 13.

In particular, according to a method of the present invention, for spatially resolved and time-resolved characterization of ultrashort laser pulses, a spatially resolved non-collinear measurement of the autocorrelation function of the first or higher order is performed by means of a matrix of beam shaping individual components such that local splitting of the beam into a beam matrix of conical component beams is performed, with each component beam representing the spatially integrated information over the partial face of the matrix through which it passes, the spatial resolution is thus determined by the matrix geometry, and the interference pattern produced in space by each component beam in a certain plane imaged on a matrix camera provides an autocorrelation function of the first order or a higher order. Accordingly, by using non-linear interactions in a suitable medium, the coherence time or pulse period of individual laser pulses or trains of several laser pulses can be determined as a function of the location.

According to a preferred embodiment of the present invention, individual elements of a beam shaping matrix are formed by micro-optical components such as thin-film micro-axicons which are advantageously characterized by a low dispersion and low absorption and thus a low susceptibility to destruction with respect to high powers. Depending on the embodiment, the influence of neighboring elements is to be taken into account as a function of the pulse period (change in the angular components contributing to interference due to differences in transit time with very short pulses). This influence can also be utilized to gain additional information on the pulse properties.

In another embodiment of the present invention, a suitable arrangement of highly reflective micro-axicons may be used, making it possible to prevent dispersive effects even more effectively.

In yet another embodiment of the present invention, the individual elements of the beam shaping matrix are designed so that the conical component beams form small angles to the optical axis such that the lengths of the interference zones on the respective optical axis, measured in the axial direction, amount to at least ten times the diameter of the individual elements.

In yet another embodiment, a CCD matrix camera with an integrated non-linear optical medium is brought directly, without any imaging system, into the plane of the interference medium to be analyzed. This eliminates aberrations in the imaging system.

In another embodiment, individual elements with different diameters are integrated into an inhomogeneous matrix to achieve a spatially variable resolution and thus the possibility of adaptation to special intensity profiles with extreme local differences in the increase in intensity. In addition, by using suitable image processing software, additional time-integrated information regarding the spatial distribution of the wave front curvature can be obtained from the position of the points of emphasis of the matrix-like interference pattern (distortion in comparison with a reference matrix which corresponds to illumination with a planar wave front). This method is known as the Shack-Hartmann method; the necessary algorithms for image analysis are also known in the state of the art. The diameters of the individual elements of the matrix are partially responsible for determining the spatial resolution, and diffraction effects also increase in the direction of smaller diameters, as do the requirements of the spatial resolution of the imaging system and the matrix camera, so parameter optimization according to the time scale and spectral range is necessary. The period of the individual elements of the beam shaping matrix is preferably selected to be large in comparison with the laser wavelength. If SHG is used as non-linear frequency conversion to implement autocorrelation of the second order, the SHG signal must be separated from the fundamental wave with a spectrally selective element (filter, grating). In higher-order processes, the signal intensity has a non-linear dependence on the laser intensity, so it is expedient to use a camera with a high dynamic range and a non-linear, preferably logarithmic characteristic, so that overloading can be prevented in this way and thus the entire beam profile can be measured.

The object of the present invention is further achieved by a method of the present invention for spatially resolved and time-resolved characterization of ultrashort laser pulses, a non-collinear measurement of the autocorrelation function of the first or higher order or simultaneously of the first and higher order by means of a beam shaping individual element whose transverse dimensions are sufficiently small with respect to the beam diameter takes place such that incremental local scanning of the beam is achieved by varying the position of the individual elements with respect to the beam profile, and in each position the interference pattern produced in space by the component beam in a certain plane imaged on a matrix camera supplies an autocorrelation function of the first order or, utilizing non-linear interactions in a suitable medium, it supplies an autocorrelation function of a higher order accordingly, so that under the assumption of sufficiently minor fluctuations, the coherence time or pulse period of repeated laser pulses can be determined as a function of location.

In contrast with the matrix arrangement, any interfering influences of neighboring elements are prevented when using just one individual element in the scanning arrangement (perpendicular to the optical axis).

In one embodiment of this method of the present invention, the individual element is a micro-optical component such as a thin-film micro-axicon which is characterized to advantage by a low dispersion and low absorption and thus a low susceptibility to destruction with respect to high powers.

In yet another embodiment, a reflecting micro-optical component is used in a reflex arrangement, so that dispersive effects are eliminated.

In still another embodiment, the individual element is designed so that the conical component beams form such a small angle to the optical axis that the length of the interference zone on the optical axis, measured in the axial direction, amounts to at least ten times the diameter of the individual element.

In another embodiment, a CCD matrix camera with an integrated non-linear optical medium is brought directly, without any imaging system, into the plane of the interference pattern to be analyzed. This eliminates aberrations in the imaging system.

In another embodiment, independent detectors are used and may also be operated individually.

In another embodiment, one or more frequency transformations which are based, among other things, on excitation under a fluorescence which decays slowly in comparison with the time constants of the detectors and is in a spectral range that can be detected well are provided downstream from a frequency transformation in a first non-linear medium.

In one embodiment, the individual elements of the beam shaping matrix are applied directly to the non-linear medium or are generated through suitable structuring of same.

The arrangements described here represent multichannel measurement systems with regard to the position coordinates, where the number of channels is defined by the number of individual elements of the beam shaping matrix. In addition to the diffraction, the ratio of the aperture of the individual elements to the period of the matrix also determines the losses to a significant extent, so complete utilization of the total area of the matrix is advantageous due to a high filling factor. In the case of round individual elements in a homogeneous matrix of individual elements of the same shape, the highest filling factor is implemented by a hexagonal arrangement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
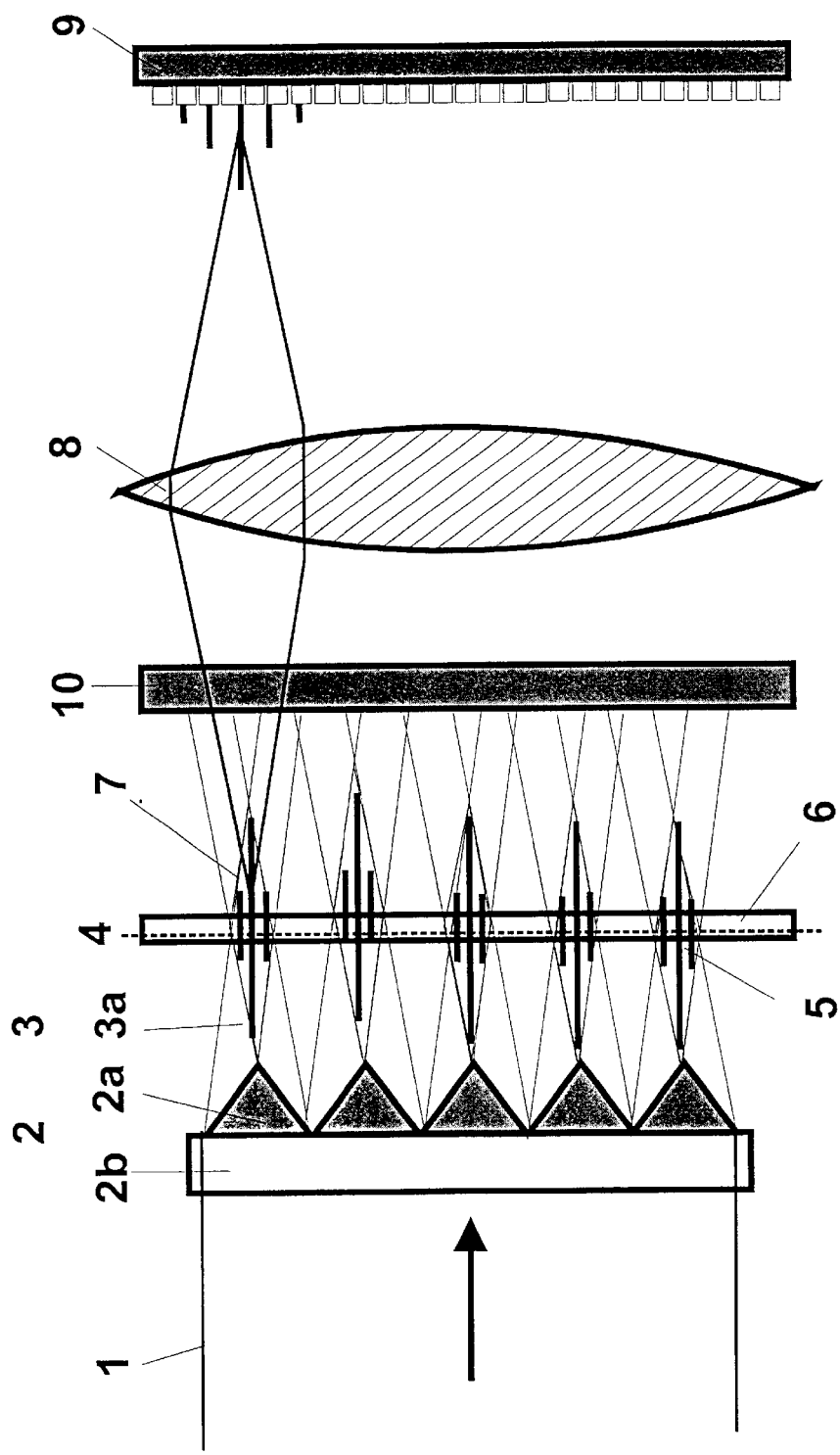
FIG. 1 is a schematic diagram of the arrangement of spatially resolved and time-resolved interferometric characterization of ultrashort laser pulses according to the present invention.

To illustrate the present invention an arrangement as diagramed in FIG. 1 for spatially resolved and time-resolved characterization of ultrashort laser pulses based on a spatially resolved, non-collinear measurement of the autocorrelation function of the first and/or higher order by means of a matrix of beam shaping individual elements is referred to. The light source used is a beam 1 of a Ti:Sa laser with a mean wavelength of 790 nm and a follow-up frequency of 1 kHz.

Circular micro-axicons of $SiO_2$ in a hexagonal matrix arrangement on a thin planar quartz substrate 2b with a minimal pitch (period) of 405 nm are used as the individual elements 2a of beam shaping matrix 2; they are applied to quartz substrate 2b by a thin-film technique (masked vapor deposition). The surface of the beam shaping matrix 2 filled by the individual elements 2a is much larger than the typical cross-sectional area of laser beam 1. The thickness profiles of the micro-axicons can each be described by a two-dimensional Gaussian distribution with a maximum thickness of 5.7 $\mu$m at the center. The matrix 2 of beam shaping individual elements 2a produces local splitting of beam 1 into a beam matrix 3 of conical component beams 3a, where each component beam 3a represents the spatially integrated information about the partial area of the beam shaping matrix 2 through which that component beam passes, and the spatial resolution is thus determined by the matrix geometry, while the respective interference patterns 5 contain the time information.

A non-linear crystal 6 of BBO is introduced into plane 4, which is perpendicular to the optical axis, at a distance at which the component beams 3a supply interference patterns 5 that can be analyzed especially well, and at a suitable angle to the optical axis at which the interference patterns 5 are converted into an SHG signal 7 by second harmonic generation (SHG) in the UV range at a wavelength around 395 nm. The signal is proportional to the square of the laser intensity and is imaged with a suitable resolution by an imaging system 8 that includes a microscope lens and a zoom lens on a CCD matrix camera 9.

The laser radiation (fundamental wave) is filtered out by means of a glass filter 10 of a suitable spectral transmission curve, and thus only SHG signal 7 which is to be detected is picked up. In the geometric arrangement described here, only very small angles to the optical axis (<2°) occur, which thus makes this arrangement especially suitable for non-linear frequency transformation.

It should be pointed out that if the angle is too small, the time resolution can be impaired by large ring spacings in the interference pattern that are more difficult to analyze.

The geometric arrangement described here permits a characterization of pulse periods of <30 fs. This increase is selected so that there is optimal adaptation to the pixel size. An autocorrelation function of the second order is extracted from the SHG intensity pattern 7 detected by the CCD matrix camera 9 according to known algorithms for non-collinear autocorrelators, and thus the pulse period of individual laser pulses (in the case of measurement by means of an electronic gate of the camera) or trains of multiple laser pulses (in integrating operation of the camera) is determined as a function of location.

Simultaneous detection of the autocorrelation function of the first and second order is performed by the fact that the non-linear crystal 6 covers only a partial range (preferably half of the spatial distribution).

Figure 2:
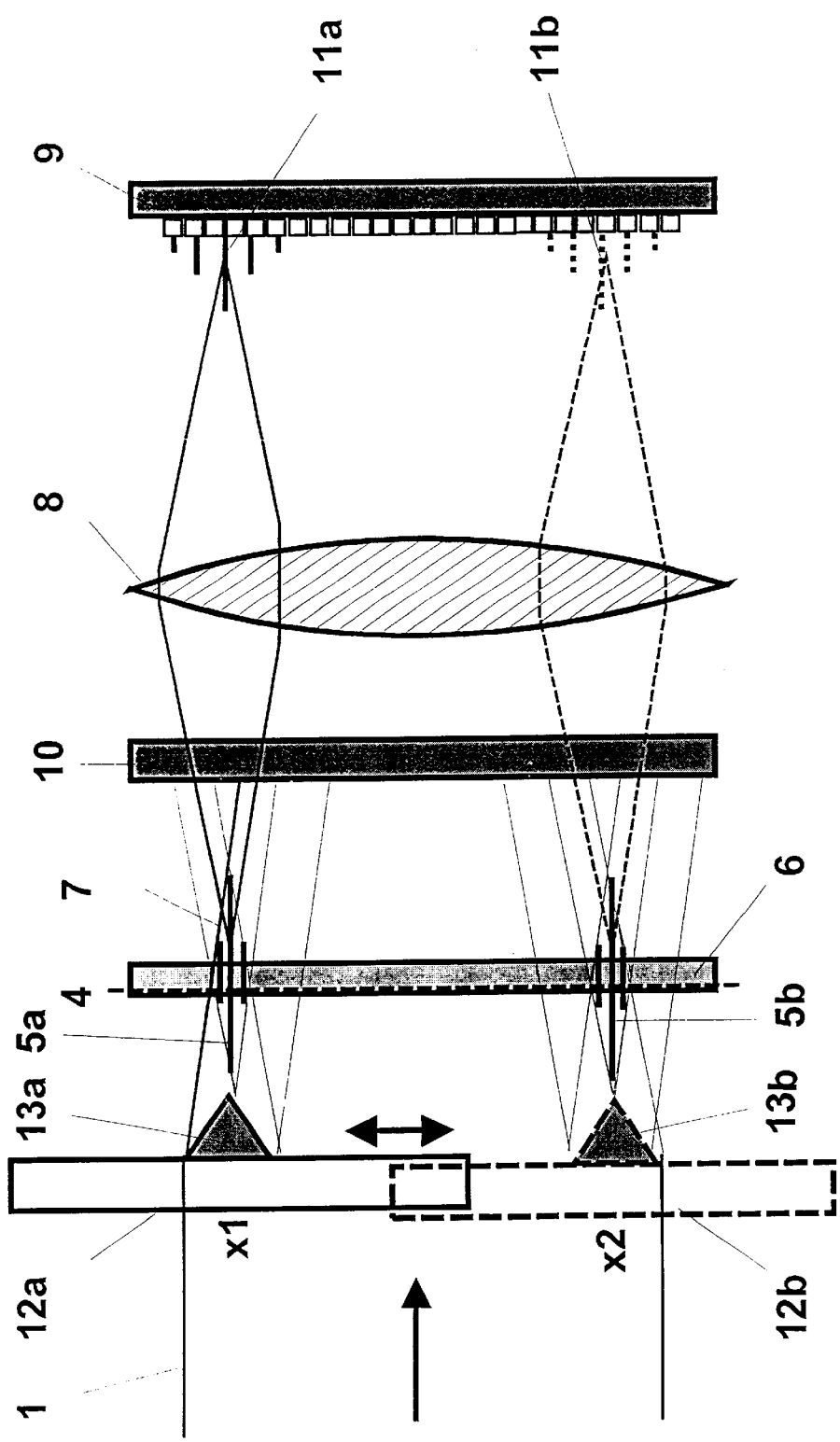
FIG. 2 is a schematic diagram of a second arrangement according to the present invention.

To further illustrate the present invention (without imaging) an arrangement for spatially and time-resolved characterization of ultrashort laser pulses based on a spatially resolved non-collinear measurement of the autocorrelation function of the first or higher order is disclosed. FIG. 2 shows this embodiment. In place of the matrix of beam shaping elements, a single beam shaping element 13 is provided on a substrate 12. The substrate moves between a number of positions, with two being shown as position x1 and position x2. In the first position, the substrate is indicated as 12a and the beam shaping element as 13a. In the second position, there are referred to as 12b and 13b, respectively. In each of these positions, the detect SHG interference pattern is shown as 11a and 11b, respectively. Likewise, the specific interference pattern is also described as 5a and 5b, respectively. The remainder of the apparatus shown in FIG. 2 operates in a similar fashion to that in FIG. 1.

Instead of a simultaneously processing matrix, only one beam shaping individual element is used here, its transverse dimensions being sufficiently small with respect to the beam diameter, and it scans the laser beam incrementally locally (scanning method). Any interfering influences of neighboring elements can thus be ruled out. Pulse trains in repeating operation can be characterized, but individual pulses cannot. The prerequisite is a sufficiently and good reproducibility of the intensity profiles from one pulse to the next over the location.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of spatially resolved and time-resolved interferometric characterization of ultrashort laser pulses, wherein a spatially resolved non-collinear measurement of an autocorrelation function of a first or higher order is performed by means of a matrix of beam shaping individual elements, whereby there is a local splitting of the beam into a beam matrix of conical component beams, where each component beam represents spatially integrated information regarding a partial area of the matrix through which it passes, spatial resolution is thus determined by matrix geometry, and an interference pattern produced in space by each component beam in a certain plane imaged on a matrix camera supplies an autocorrelation function of the first order or, by utilizing non-linear interactions in a suitable medium, an autocorrelation function of a higher order accordingly, so that a coherence time or a pulse period of individual laser pulses or trains of multiple pulses can be determined as a function of location.

2. The method according to claim 1, wherein the individual elements of the beam shaping matrix are formed from thin-film micro-axicons.

3. The method according to claim 1, wherein the individual elements of the beam shaping matrix are formed from reflecting micro-axicons or combinations of mirrors and arrays of refractive non-spherical micro-lenses in a suitable arrangement.

4. The method according to claim 1, wherein the conical component beams form such small angles to the optical axis that the lengths of the interference zones on the respective optical axis, measured in the axial direction, amount to at least ten times the diameter of the individual elements.

5. The method according to claim 1, wherein a CCD matrix camera with an integrated non-linear optical medium is brought directly, without any imaging system, into the plane of the interference pattern to be analyzed.

6. The method according to claim 1, wherein the individual elements with different diameters are integrated into an inhomogeneous matrix to achieve a spatially variable resolution and thus achieve the possibility of adaptation to special intensity profiles with an extreme difference in the increase in intensity locally.

7. The method according to claim 1, wherein the individual elements are applied directly to the non-linear medium or are created by suitable structuring of same.

8. A method of spatially resolved and time-resolved characterization of ultrashort laser pulses, wherein a non-collinear measurement of an autocorrelation function of a first or higher order or simultaneously of a first and higher order by means of a beam shaping individual element, whose transverse dimensions are sufficiently small with respect to a beam diameter, is performed such that an incremental local scanning of a beam is achieved by varying a position of the individual element with respect to a beam profile, and an interference pattern produced by a component beam in each position in a certain plane in space imaged on a matrix camera supplies an autocorrelation function of the first order, or by utilizing non-linear interactions in a suitable medium, it supplies an autocorrelation function of a higher order accordingly, so that under a prerequisite of sufficiently small fluctuations, a coherence time or a pulse period of repeating laser pulses can be determined as a function of location.

9. The method according to claim 8, wherein a micro-optical component such as a thin-film micro-axicon is used as an individual element.

10. The method according to claim 8, wherein a highly reflective micro-optical component in a reflection arrangement is used.

11. The method according to claim 8, wherein the individual element is designed such that conical component beams form such a small angle to an optical axis that a length of the interference zone on the optical axis, measured in an axial direction, amounts to at least ten times a diameter of the individual element.

12. The method according to claim 8, wherein a CCD matrix camera with an integrated non-linear optical medium is brought directly, without an imaging system, into a plane of the interference pattern to be analyzed.

13. An arrangement for spatially resolved and time-resolved interferometric characterization of ultrashort laser pulses, comprising:
   a matrix of beam shaping individual elements, where an area covered by the whole matrix is much larger than a cross-sectional area of a laser beam;
   a non-linear optical crystal in which the interference patterns are converted into an SHG signal, which is proportional to a square of the laser intensity by generation of a second harmonic, said optical crystal being arranged at a suitable angle to the optical axis in a plane of the interference patterns of locally split component beams;
   a filter of a suitable spectral transmission curve for detection of the SHG signal;
   an imaging system; and
   a downstream CCD matrix camera;
   wherein said filter, imaging system and matrix camera are provided for analysis.

14. The arrangement according to claim 13, wherein the arrangement is a multi-channel measurement system having a number of channels defined by a number of said individual elements and detectors operated independently of one another.

15. The arrangement according to claim 13, wherein the beam shaping elements are formed from thin-film micro-axicons.

16. The arrangement according to claim 13, wherein the beam shaping elements are formed from reflecting micro-axicons or combinations of mirrors and arrays of refractive non-spherical micro-lenses in a suitable arrangement.

17. The arrangement according to claim 13, wherein conical component beams form such small angles to the optical axis that the lengths of the interference zones on the respective optical axis, measured in the axial direction, amount to at least ten times the diameter of the individual elements.

18. The arrangement according to claim 13, wherein the individual elements with different diameters are integrated into an inhomogeneous matrix to achieve a spatially variable resolution and thus achieve the possibility of adaptation to special intensity profiles with an extreme difference in the increase in intensity locally.

19. The arrangement according to claim 13, wherein the individual elements are applied directly to the non-linear medium or are created by suitable structuring of same.

20. An arrangement for spatially resolved and time-resolved interferometric characterization of ultrashort laser pulses, comprising:
   at least one beam shaping individual element, whose transverse dimensions are sufficiently small with respect to a beam diameter, an incremental local scanning of the beam being achieved by varying a position of the beam shaping individual element with respect to a beam profile;
   a non-linear optical crystal in which the interference patterns are converted into an SHG signal, which is proportional to a square of the laser intensity by generation of a second harmonic, said optical crystal being arranged at a suitable angle to the optical axis in a plane of the interference patterns of locally split component beams;

a filter of a suitable spectral transmission curve for detection of the SHG signal;

an imaging system; and a downstream CCD matrix camera;

wherein said filter, imaging system and matrix camera are provided for analysis.

21. The arrangement according to claim 20, wherein the at least one beam shaping individual element moves to a plurality of positions in order to cover an area larger than the cross-sectional area of a laser beam.

22. The arrangement according to claim 20, wherein the beam shaping elements are formed from thin-film micro-axicons.

23. The arrangement according to claim 20, wherein the beam shaping elements are formed from reflecting micro-axicons or combinations of mirrors and arrays of refractive non-spherical micro-lenses in a suitable arrangement.

24. The arrangement according to claim 13, wherein conical component beams form such small angles to the optical axis that the lengths of the interference zones on the respective optical axis, measured in the axial direction, amount to at least ten times the diameter of the individual elements.

25. The arrangement according to claim 20, wherein the individual elements are applied directly to the non-linear medium or are created by suitable structuring of same.

26. An arrangement for spatially resolved and time-resolved interferometric characterization of ultrashort laser pulses, comprising:

at least one beam shaping individual element, whose transverse dimensions are sufficiently small with respect to a beam diameter, an incremental local scanning of the beam being achieved by varying a position of the beam shaping individual element with respect to a beam profile;

a non-linear optical crystal in which the interference patterns are converted into an SHG signal, which is proportional to a square of the laser intensity by generation of a second harmonic, said optical crystal being arranged at a suitable angle to the optical axis in a plane of the interference patterns of locally split component beams;

a filter of a suitable spectral transmission curve for detection of the SHG signal; and a downstream CCD matrix camera having an integrated non-linear optical medium;

wherein said camera is brought directly without an imaging system into the plane of the interference pattern to be analyzed and said filter, imaging system and matrix camera are provided for analysis.

27. An arrangement for spatially resolved and time-resolved interferometric characterization of ultrashort laser pulses, comprising:

a matrix of beam shaping individual elements, where an area covered by the whole matrix is much larger than a cross-sectional area of a laser beam;

a non-linear optical crystal in which the interference patterns are converted into an SHG signal, which is proportional to a square of the laser intensity by generation of a second harmonic, said optical crystal being arranged at a suitable angle to the optical axis in a plane of the interference patterns of locally split component beams;

a filter of a suitable spectral transmission curve for detection of the SHG signal; and a downstream CCD matrix camera with an integrated non-linear optical medium;

wherein said camera is brought directly without an imaging system into the plane of the interference pattern to be analyzed and said filter, imaging system and matrix camera are provided for analysis.

* * * * *

UNITED STATES PATENT AND TRADEMARK OFFICE
CERTIFICATE OF CORRECTION

PATENT NO.     : 6,683,691 B2
DATED          : January 27, 2004
INVENTOR(S)    : Dr. Ruediger Grunwald et al.

It is certified that error appears in the above-identified patent and that said Letters Patent is hereby corrected as shown below:

<u>Title page,</u>
Item [73], Assignee, change the first Assignee's name from "Max-Born-Institut" to
-- Forschungsverbund Berlin e.V. --

Signed and Sealed this

Fifth Day of October, 2004

JON W. DUDAS
*Director of the United States Patent and Trademark Office*